(12) United States Patent
Tsukada et al.

(10) Patent No.: US 8,334,933 B2
(45) Date of Patent: Dec. 18, 2012

(54) TELEVISION OPERATION METHOD

(75) Inventors: Yujin Tsukada, Saitama (JP); Takeshi Hoshino, Kodaira (JP); Isshu Nakajima, Tokyo (JP); Tatsuya Tokunaga, Tokyo (JP); Kazumi Matsumoto, Tokyo (JP); Takashi Yoshimaru, Kokubunji (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 366 days.

(21) Appl. No.: 12/695,258

(22) Filed: Jan. 28, 2010

(65) Prior Publication Data

US 2010/0245680 A1 Sep. 30, 2010

(30) Foreign Application Priority Data

Mar. 30, 2009 (JP) ................................ 2009-082817

(51) Int. Cl.
*H04N 5/45* (2011.01)
(52) U.S. Cl. ...................................... 348/734
(58) Field of Classification Search .................. 348/734, 348/725, 552, 553; 345/173, 168, 169; 715/718, 715/716, 717; 725/110, 39, 86
See application file for complete search history.

(56) References Cited

U.S. PATENT DOCUMENTS

| | | | |
|---|---|---|---|
| 6,567,984 B1 * | 5/2003 | Allport | 725/110 |
| 6,925,567 B1 * | 8/2005 | Hirata | 713/189 |
| 7,102,688 B2 * | 9/2006 | Hayes et al. | 348/465 |
| 7,376,843 B2 * | 5/2008 | Hirata | 713/189 |
| 7,477,321 B2 | 1/2009 | Yokoyama et al. | |
| 7,610,555 B2 * | 10/2009 | Klein et al. | 715/738 |
| 7,908,555 B2 * | 3/2011 | Zellner | 715/718 |
| 8,135,334 B2 * | 3/2012 | Dennisson et al. | 455/3.06 |
| 2002/0144273 A1 * | 10/2002 | Reto | 725/86 |
| 2004/0056837 A1 * | 3/2004 | Koga et al. | 345/156 |
| 2004/0152414 A1 * | 8/2004 | Wang | 455/3.04 |
| 2005/0028222 A1 * | 2/2005 | Megeid | 725/135 |
| 2005/0091493 A1 * | 4/2005 | Hirata | 713/170 |
| 2005/0097191 A1 * | 5/2005 | Yamaki et al. | 709/219 |
| 2005/0262535 A1 | 11/2005 | Uchida et al. | |
| 2006/0053444 A1 * | 3/2006 | Rudolph et al. | 725/38 |
| 2008/0180303 A1 * | 7/2008 | Yamamoto et al. | 341/176 |

FOREIGN PATENT DOCUMENTS

| | | |
|---|---|---|
| CN | 1679319 A | 10/2005 |
| CN | 101057208 A | 10/2007 |
| JP | 2003-333359 A | 11/2003 |
| JP | 2004-96361 A | 3/2004 |
| WO | 2006/052347 A1 | 5/2006 |

* cited by examiner

*Primary Examiner* — Paulos Natnael
(74) *Attorney, Agent, or Firm* — Mattingly & Malur, PC

(57) ABSTRACT

A television operation method whereby a desired content screen can be shown on a TV receiver by controlling operation on the display of a remote terminal. When the TV display of the TV receiver shows a received program screen and the remote display of the remote terminal shows another received program screen, if the screen shown on the remote display is transferred to the TV display, a reception remote control screen to enable channel selection appears on the remote display. If buttons are operated so as to show a related web screen on the remote display and transfer the related web screen to the TV display, a web remote control screen for control of a cursor on the related web screen appears on the remote display.

8 Claims, 14 Drawing Sheets

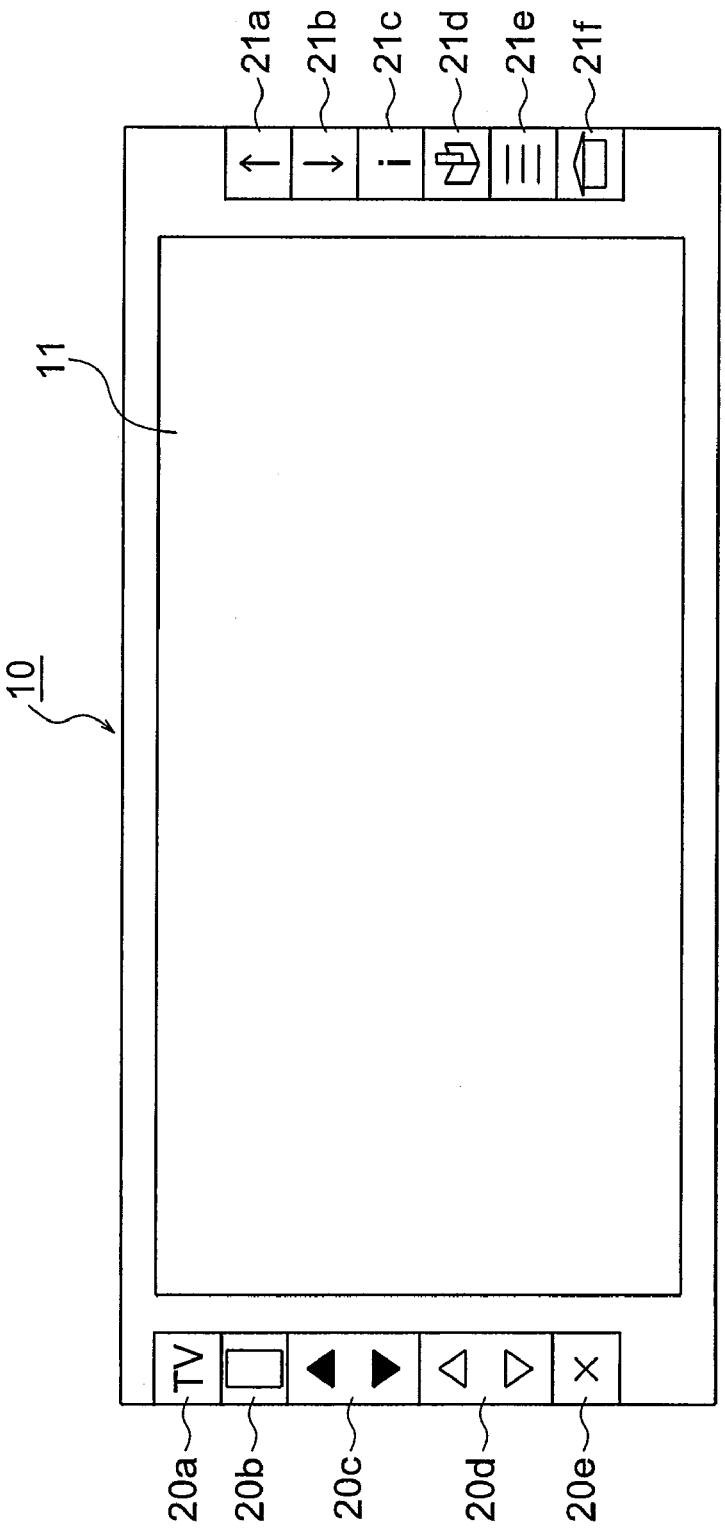

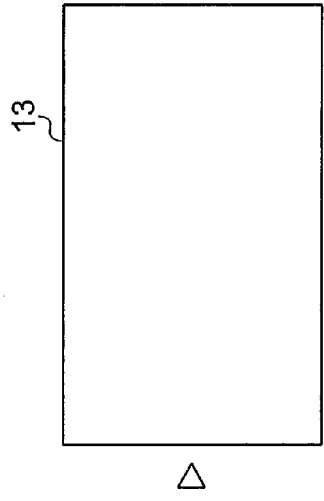
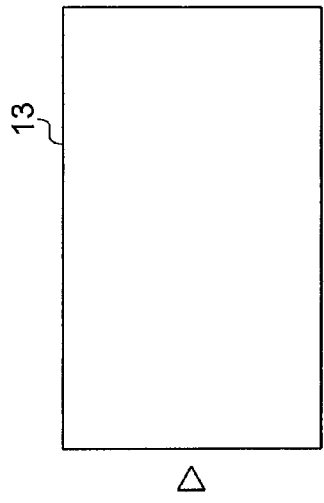
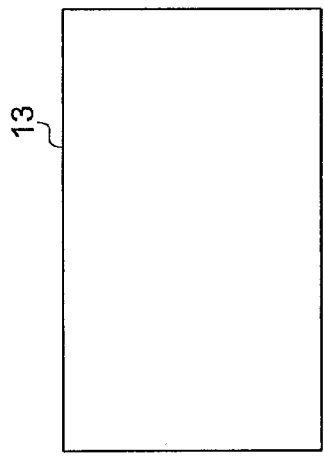
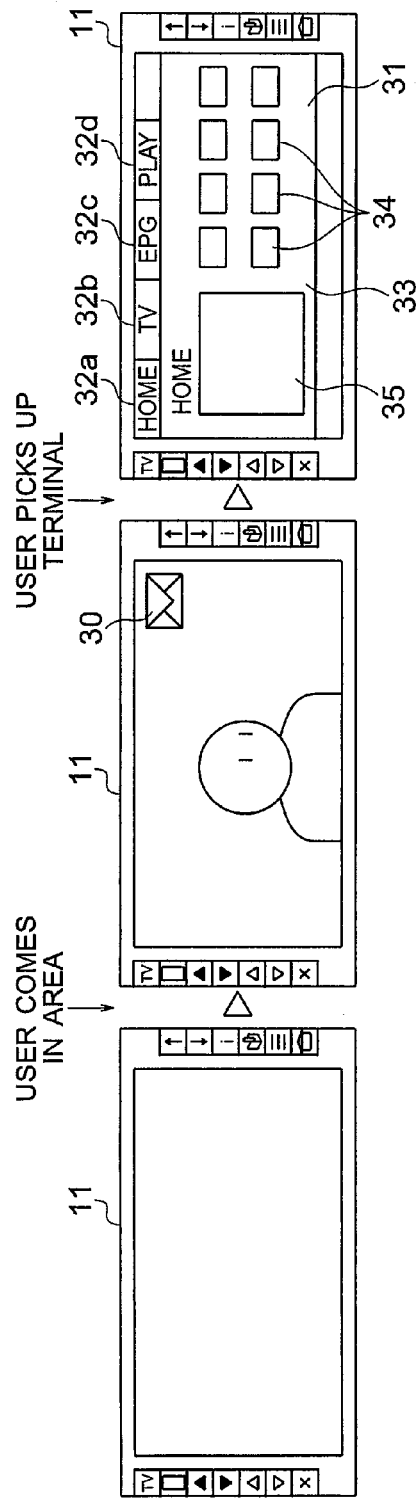

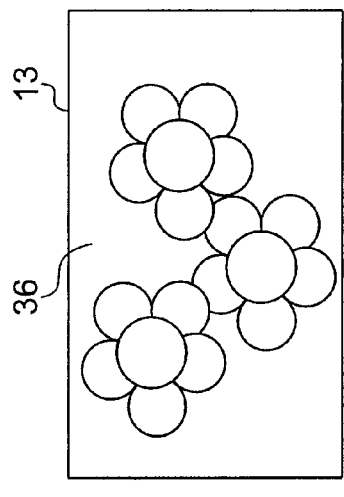
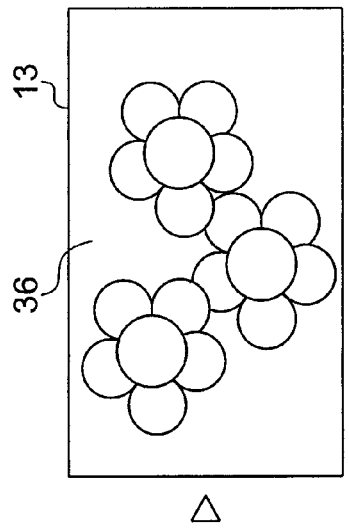
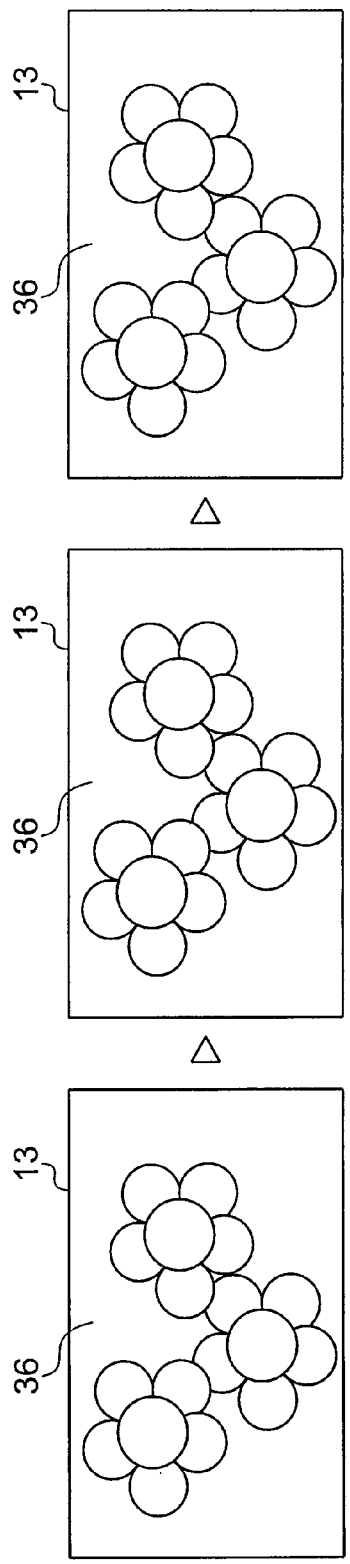

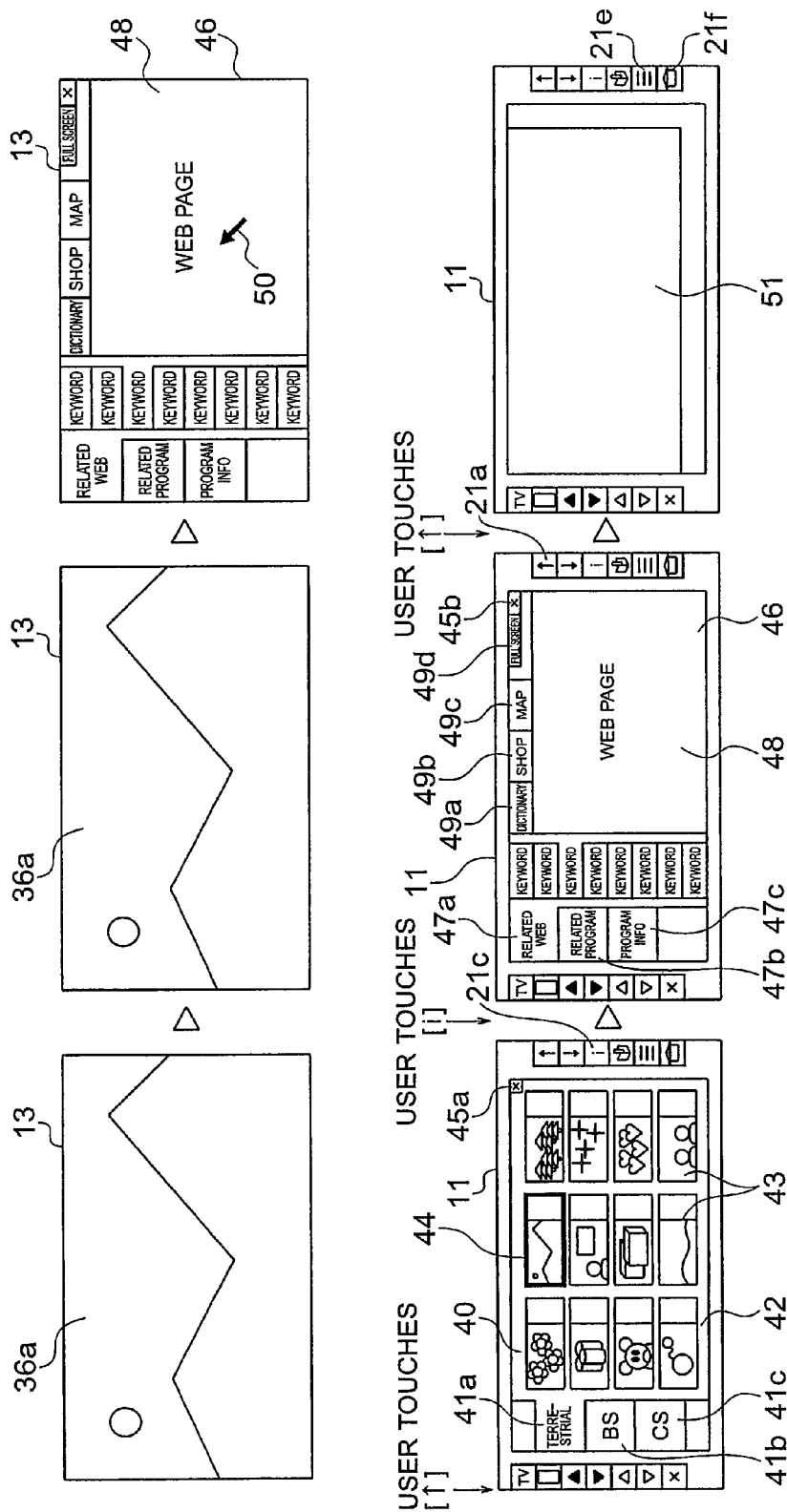

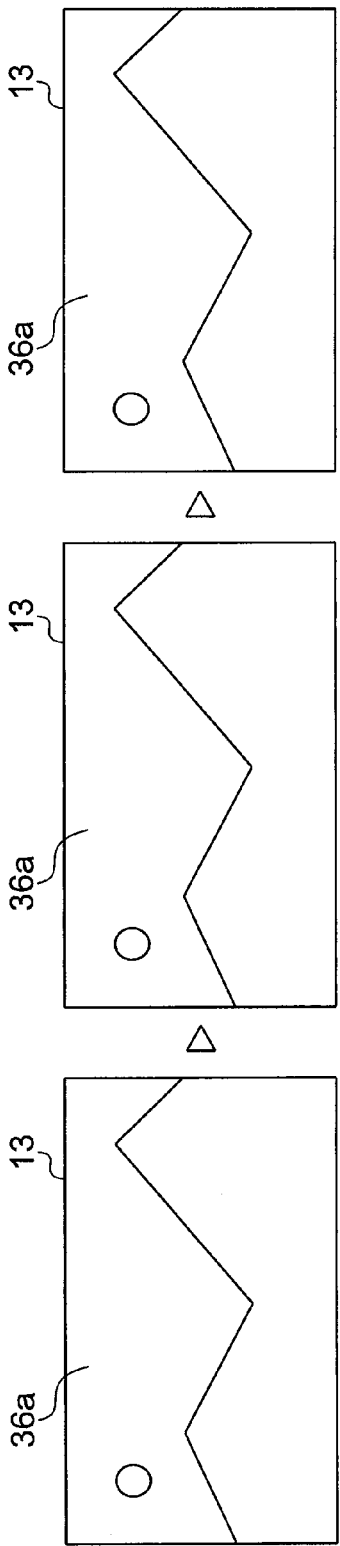

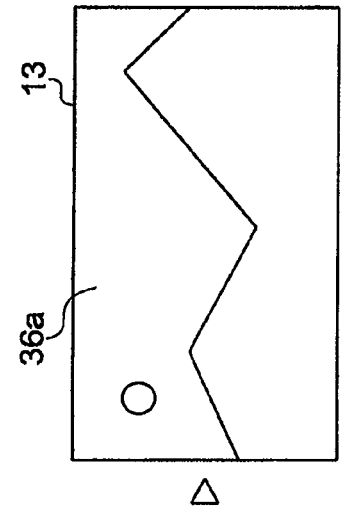
FIG. 7A
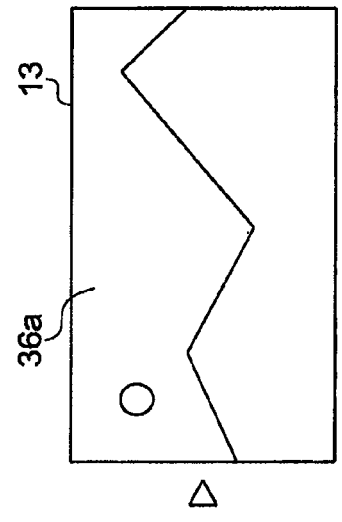
FIG. 7B
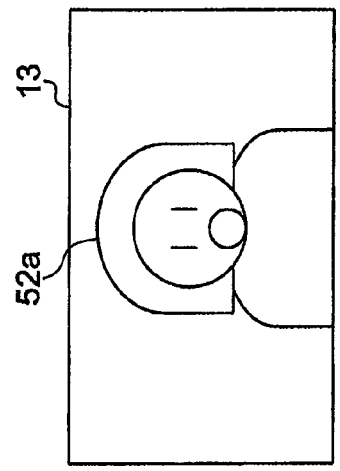
FIG. 7C
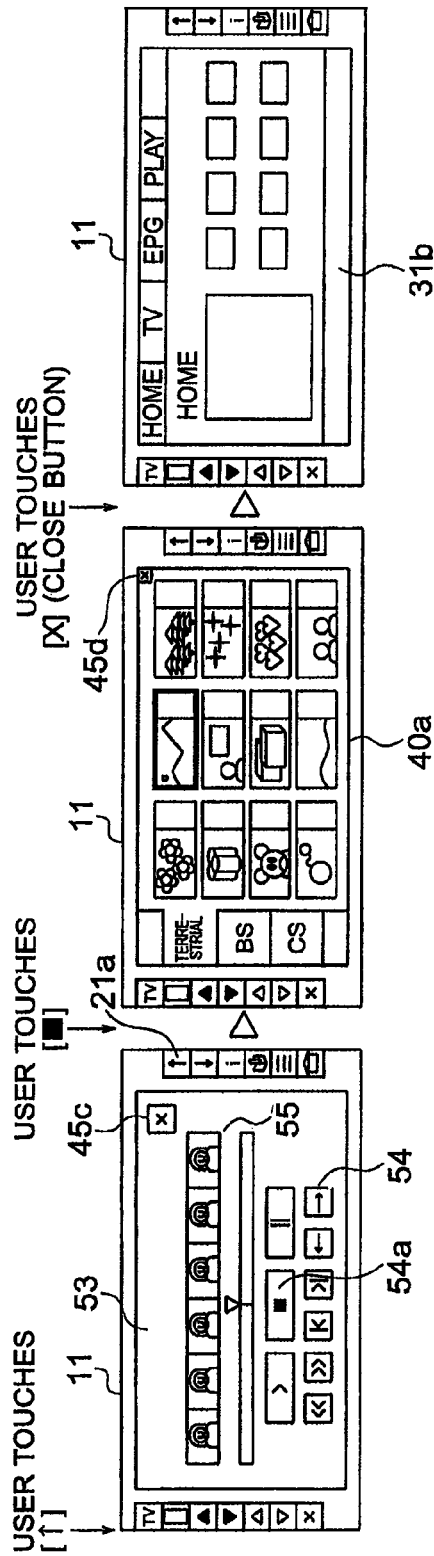

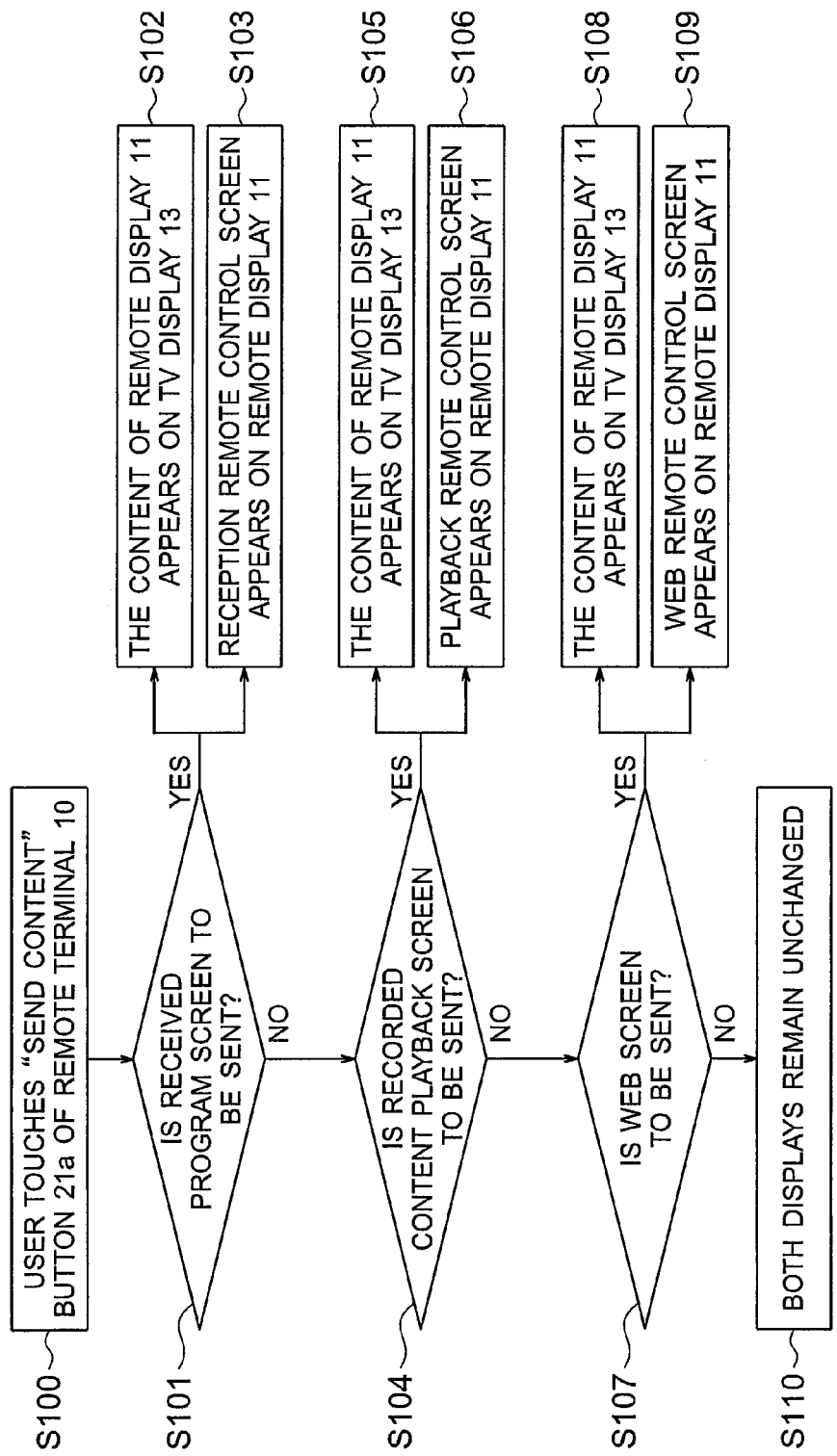

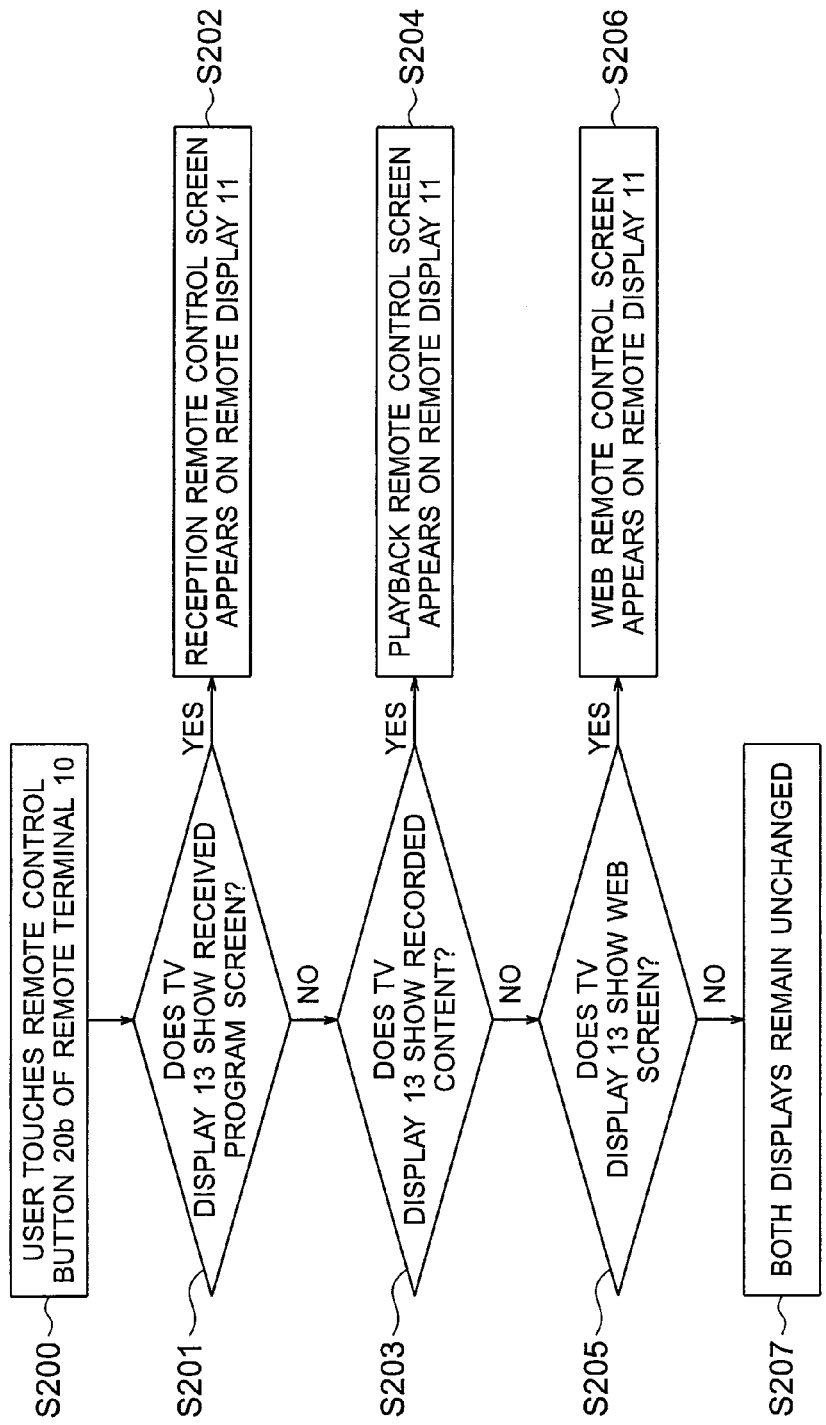

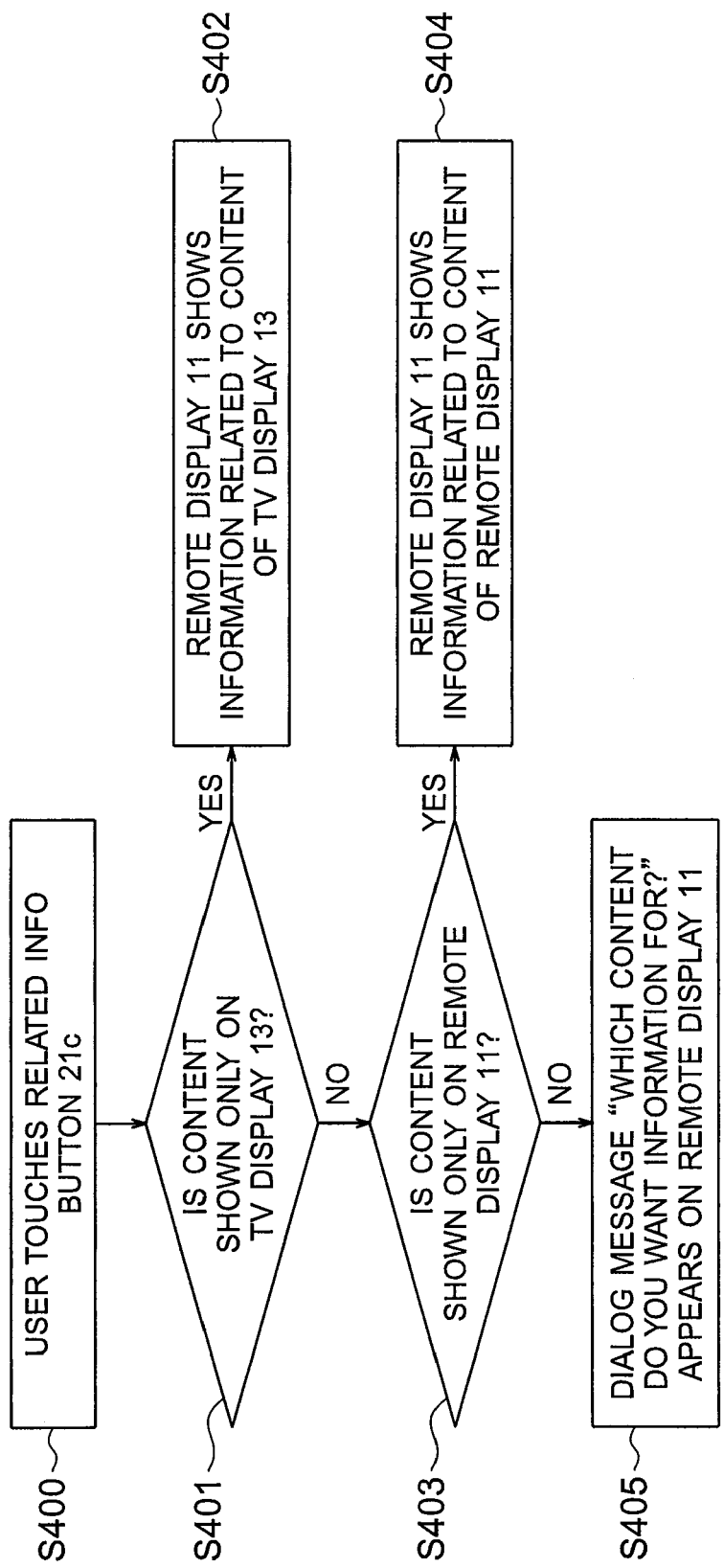

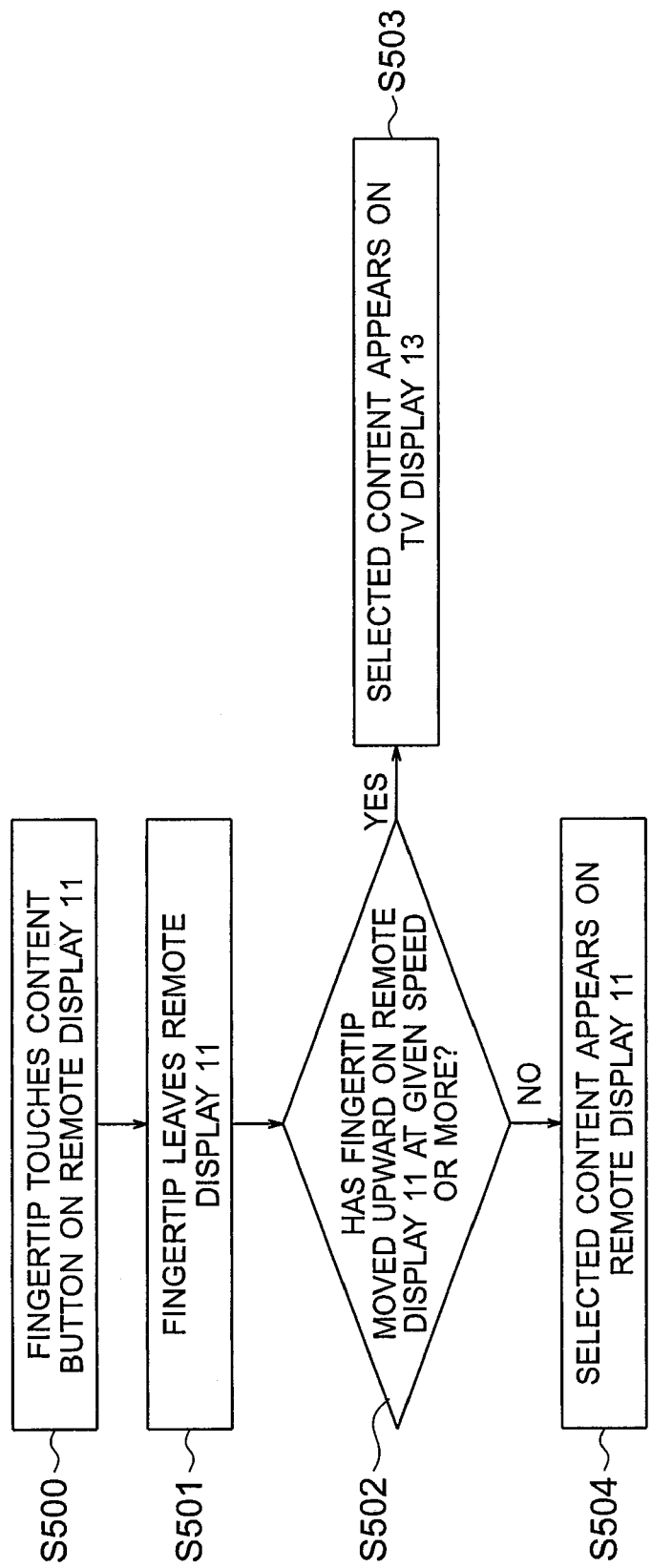

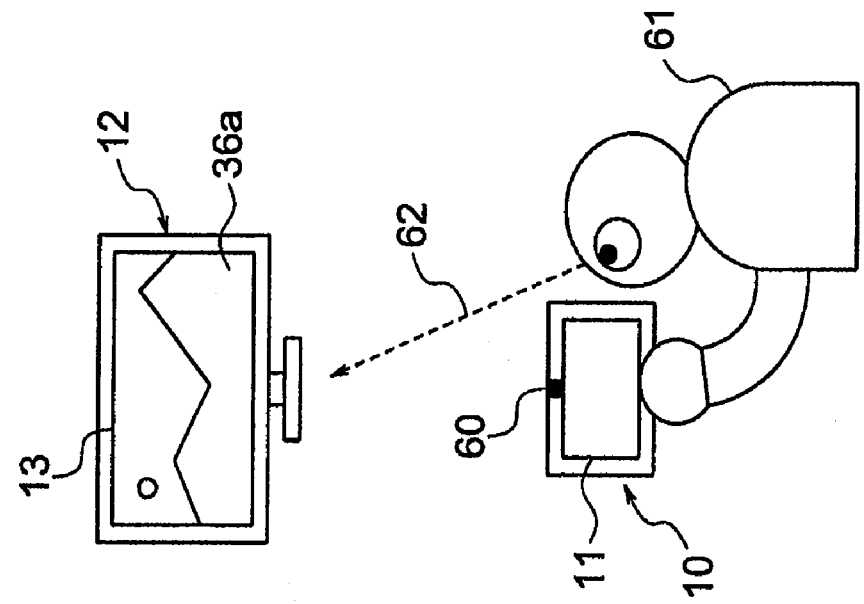
FIG. 13A
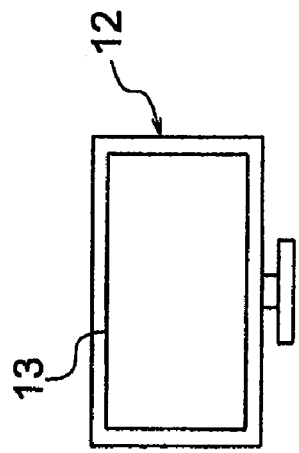
FIG. 13B
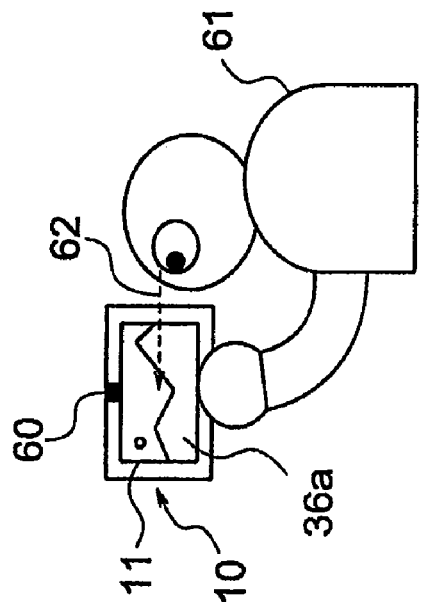

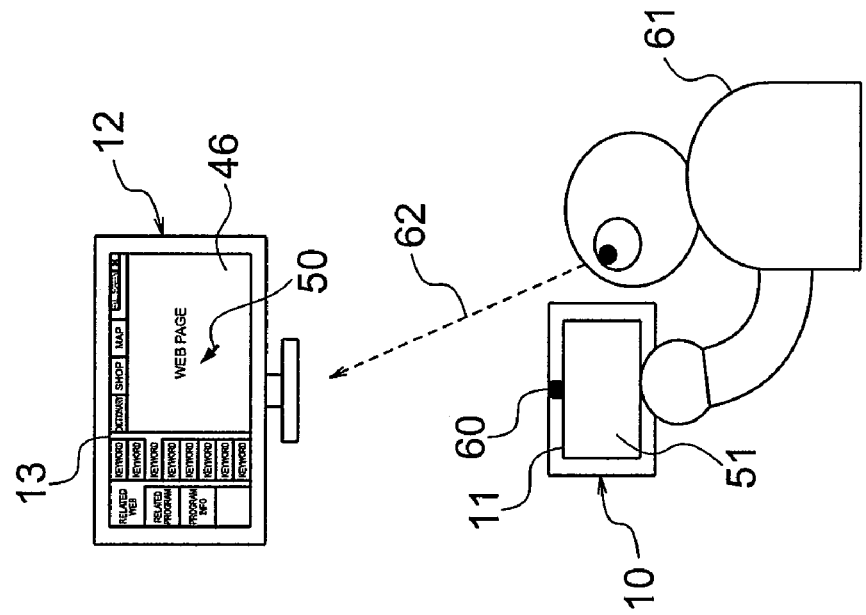
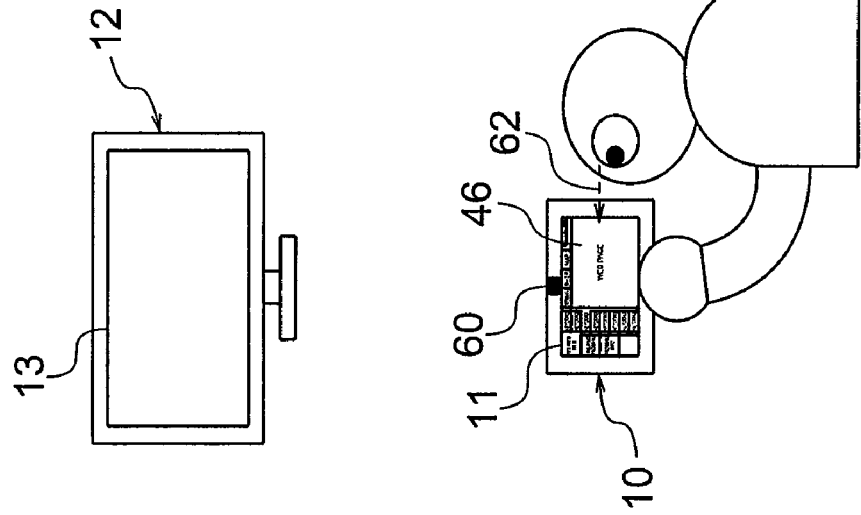

TELEVISION OPERATION METHOD

CLAIM OF PRIORITY

The present invention claims priority based on Japanese Patent Application No. 2009-082817 filed in the Japanese Patent Office on Mar. 30, 2009. The subject matter of this priority document is incorporated by reference herein.

BACKGROUND OF THE INVENTION

1. Field of the Invention

The present invention relates to a television display method for showing contents such as received programs and web pages on a display of a television (TV) receiver set and more particularly to an operation method therefor.

2. Description of the Related Art

A TV receiver is usually equipped with a remote controller. Using the control buttons on the remote controller, the user can turn the TV receiver on and off, change the channels for broadcast programs, record and play back broadcast programs and control the sound volume.

In this connection, a technique that the remote controller has a display which can show broadcast programs has been proposed (see JP-A No. 2004-96361).

In this technique described in JP-A No. 2004-96361, a broadcast program is shown on the display of the remote controller and the user can select channels for broadcast programs independently of the TV receiver so that once the user gets a desired broadcast program, the user can have the program shown on the display of the TV receiver as well.

Furthermore, in a proposed system which includes a large-screen display unit with a display and a portable display unit with a display, broadcast programs are shown on the display of the large-screen display unit and that of the portable display unit and the broadcast program shown on the large-screen display unit can be shown on the portable display unit as well or the broadcast program shown on the portable display unit can be shown on the large-screen display unit as well or the broadcast programs shown on the large-screen display unit and portable display unit can be exchanged (see JP-A No. 2003-333359).

In the technique described in JP-A No. 2003-333359, the display of the portable display unit has a touch panel in which a program content combined with a control panel is shown and the user can do operation for the large-size display unit by touching the control panel.

SUMMARY OF THE INVENTION

In the technique described in JP-A No. 2004-96361, the user can select a desired channel or broadcast program while watching a broadcast program on the display of the remote controller and when the selected program is shown on the TV receiver, the selected program still remains shown on the remote controller, so in order to select another channel or broadcast program, the user must repeat the above procedure, namely change channels one by one to access and receive the desired program.

In the remote controller with a display, the display screen size is limited due to the presence of various control buttons, so the screen size for a received program must be small, resulting in low operability of the display.

In the technique described in JP-A No. 2003-333359, the program shown on the large-screen display unit can be shown on the portable display unit as well and also the program shown on the portable display unit can be shown on the large-screen display unit, in which the display of the portable display unit includes a touch panel to show a program content combined with a control panel so that the user can operate the large-screen display unit by touching the control panel. However, this control panel may appear or may not appear, which means that an additional user operation may be needed.

In order to solve the above problems, an object of the present invention is to provide a television operation method whereby a desired content screen can be easily shown on a TV receiver by control operation on the display of a remote terminal.

In order to achieve the above object, according to one aspect of the invention, there is provided a television display method for a TV receiver equipped with a remote terminal having a display, in which control buttons for operation of the TV receiver are provided adjacent to the display of the remote terminal and a remote control screen is shown on the display of the remote terminal to control a content screen shown on the display of the TV receiver.

Preferably, in the method according to the invention, one of the control buttons provided adjacent to the display of the remote terminal is a "Send Content" button which is used to transfer a content screen shown on the display of the remote terminal to the display of the TV receiver and show it there, and another one of the control buttons provided adjacent to the display of the remote terminal is a "Receive Content" button which is used to transfer a content screen shown on the display of the TV receiver to the display of the remote terminal and show it there.

Preferably, in the method, when the Send Content button is operated while the display of the TV receiver shows a received program screen, the display of the remote terminal shows a reception remote control screen which enables selection of a program to be received and shown on the display of the TV receiver.

Preferably, in the method, one of plural select buttons shown on the reception remote control screen shown on the display of the remote terminal is a select button which makes the display of the remote terminal show a program selection screen for selecting a program to be received and shown on the display of the TV receiver.

Preferably, in the method, one of the control buttons provided adjacent to the display of the remote terminal is a "Related Info" button which is used, when the display of the TV receiver shows a content screen, to show a related web screen for selection of information related to the content screen.

Preferably, in the method, as the Send Content button is operated while the display of the remote terminal shows the related web screen, the related web screen appears on the display of the TV receiver and a web remote control screen for control of the related web screen with a cursor appears on the display of the remote terminal.

Preferably, in the method, one of the control buttons provided adjacent to the display of the remote terminal is a "Home" button which is used to let the remote terminal show a HOME screen which enables selection of a recorded content for playback.

Preferably, in the method, as a recorded content is selected on the HOME screen shown on the display of the remote terminal, the selected recorded content appears on the display of the remote terminal, and as the Send Content button is operated, a playback screen for the selected recorded content appears on the display of the TV receiver and a playback remote control screen for control of playback of the recorded content shown on the display of the TV receiver appears on the display of the remote terminal.

Preferably, in the method, as operation to stop playback is done on the playback remote control screen, a received program screen appears on the display of the TV receiver and a reception remote control screen for selection of a program to be received and shown on the display of the TV receiver appears on the display of the remote terminal.

Preferably, in the method, a detector to detect the direction of the line of sight of the user using the remote terminal is provided, and according to change in the direction of the line of sight as detected by the detector, a content screen shown on the display of the remote terminal is transferred to the display of the TV receiver and shown there and a content screen shown on the display of the TV receiver is transferred to the display of the remote terminal and shown there.

According to the present invention, the display of the remote terminal can show a content screen and if the user wants to transfer the content screen to the TV receiver and have it shown there, a screen to enable the user to do so can be shown on the display of the remote terminal so that the user can quickly and easily do operation to have the content screen shown on the display of the TV receiver.

BRIEF DESCRIPTION OF THE DRAWINGS

Embodiments of the present invention will be described in detail based on the attached drawings, wherein:

FIG. 2 is an external front view showing a concrete example of a remote terminal shown in FIG. 1;

FIGS. 3A to 3C illustrate a concrete example of a flow of screens on a remote display at the start of the remote terminal, in which FIG. 3A illustrates that the TV display and remote display are off, FIG. 3B illustrates that the remote display shows an initial screen, and FIG. 3C shows that it shows a HOME screen;

FIGS. 4A to 4C illustrate a concrete example of flows of screens on the TV display and remote display from the start of the TV receiver until program selection, in which FIG. 4A illustrates that the TV display shows a received program screen and the remote display shows a HOME screen, FIG. 4B illustrates that the remote display shows a program selection screen, and FIG. 4C illustrates that the remote display shows a received program screen;

FIGS. 5A to 5C illustrate a concrete example of an operation sequence for making the screen shown on the remote display appear on the TV display and flows of screens shown on the TV display and remote display, in which FIG. 5A illustrates that the TV display shows a received program screen and the remote display shows a program reception remote control screen, FIG. 5B illustrates that the remote display shows a related web screen and FIG. 5C illustrates that the TV display shows the related web screen and the remote display shows a web remote control screen;

FIGS. 6A to 6C illustrate a concrete example of a flow of screens which are concerned in operation of the Receive Content button in FIG. 2 and operation for playback of a content from the storage of the controller in FIG. 1, in which FIG. 6A illustrates that the related web screen is transferred to the remote display as a result of operation of the Receive Content button, FIG. 6B illustrates that the remote display shows a HOME screen as a result of operation of the Home button, and FIG. 6C illustrates that it shows a recorded content screen as a result of operation of a content icon;

FIGS. 7A to 7C illustrate a concrete example of a flow of screens which concern playback of a recorded content, in which FIG. 7A illustrates that the TV display shows a playback screen, FIG. 7B illustrates that the TV display shows a previous program screen and the remote display shows a program remote control screen, and FIG. 7C illustrates that the remote display shows the HOME screen as a result of operation of its Close button;

FIG. 8 is a flowchart showing screen changes which occur upon touching the Send Content button in FIG. 2;

FIG. 9 is a flowchart showing screen changes upon touching the Remote Control Mode button in FIG. 2.

FIG. 11 is a flowchart showing screen changes upon touching the Related Info button in FIG. 2;

FIG. 12 is a flowchart showing a processing sequence to select a desired content with the remote terminal and make the TV display show it directly;

FIGS. 13A and 13B illustrate a substantial part of a television operation method according to a second embodiment of the present invention, in which FIG. 13A illustrates that the user's line of sight is directed toward the front of the remote display and FIG. 13B illustrates that it is directed upward; and FIGS. 14A and 14B illustrate another substantial part of a television operation method according to the second embodiment of the invention, in which FIG. 14A illustrates that the user's line of sight is directed toward the remote display and FIG. 14B illustrates that it is directed toward the TV display.

DETAILED DESCRIPTION OF THE PREFERRED EMBODIMENTS

Next, the preferred embodiments of the present invention will be described in detail referring to the accompanying drawings.

Figure 1:
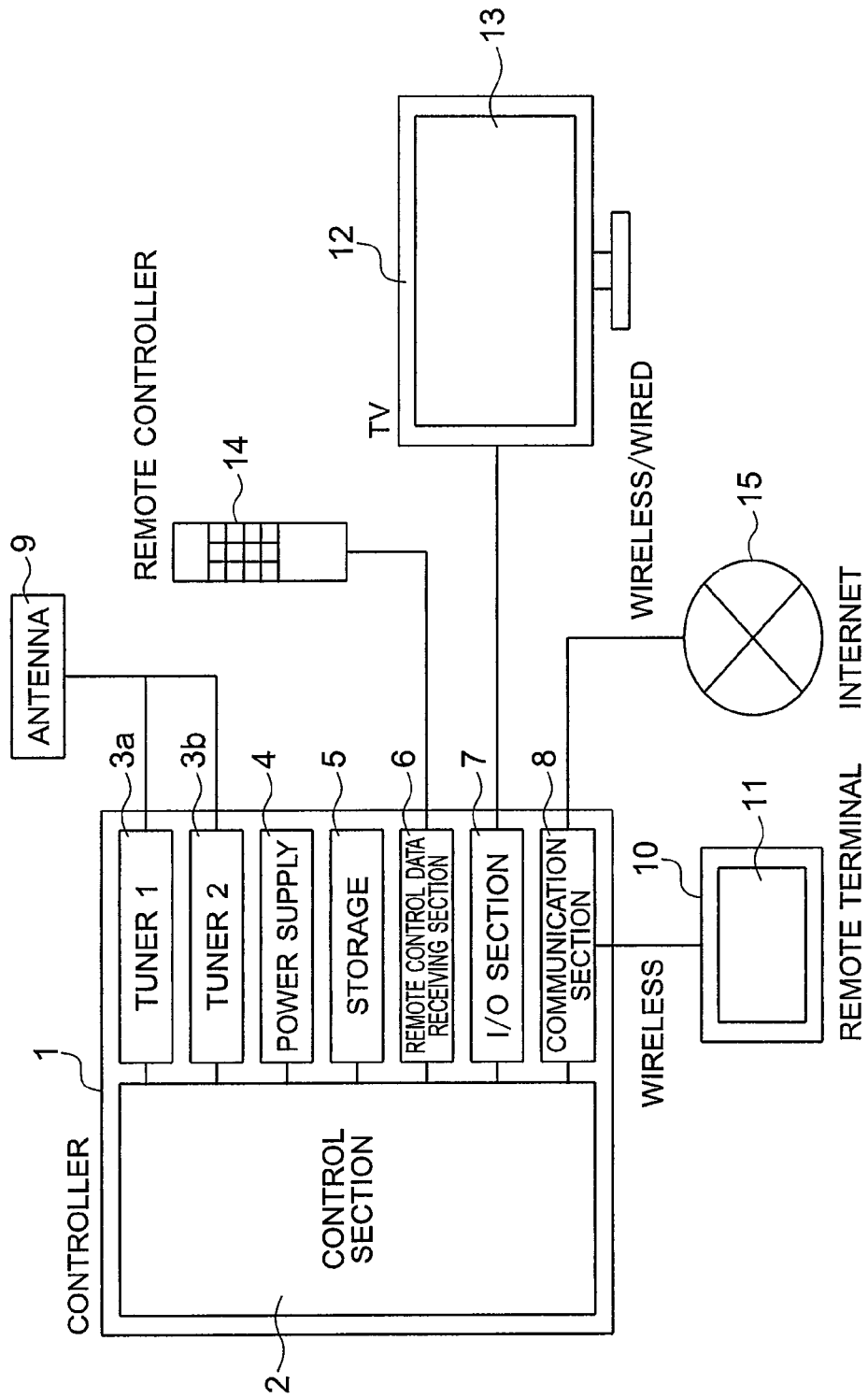
FIG. 1 shows the configuration of a system which uses a television operation method according to an embodiment of the present invention.

FIG. 1 shows the configuration of a system which uses a television operation method according to an embodiment of the present invention, in which reference numeral 1 denotes a controller, 2 a control section, 3a, 3b tuners, 4 a power supply, 5 a storage, 6 a remote control data receiving section, 7 an input/output section, 8 a communication section, 9 an antenna, 10 a remote terminal, 11 a remote display, 12 a TV (television) receiver, 13 a TV display, 14 a remote controller, and 15 a network providing a connection to the Internet.

As illustrated in FIG. 1, this embodiment is implemented by a system which includes the controller 1, portable remote terminal 10 connected with it, such as a notebook-sized personal computer, portable terminal or game machine, and the TV receiver 12.

The controller 1 includes: the two tuners 3a, 3b connected with the antenna 9; the power supply 4 which supplies voltages to various sections of the controller 1; the storage 5 which stores various types of information such as broadcast TV program records; the remote control data receiving section 6 which receives operation signals from the remoter controller 14, for example, through infrared rays; the input/output section 7 connected with the TV receiver 12; the communication section 8 connected with the remote terminal 10 and external wired or wireless network 15; and the control section 2 which controls these components and performs various processing tasks.

The tuners 3a and 3b receive broadcast TV programs through specific channels respectively under the control by the control section 2; and a broadcast TV program received by either of the tuners 3a and 3b is sent through the I/O section 7 to the TV receiver 12 where its display, or TV display 13 shows it. Similarly, a broadcast TV program received by either of the tuners 3a and 3b is sent through the communication section 8 to the remote terminal 10 where its display, or remote display 11 shows it. In this case, the remote terminal 10 and TV receiver 12 can show the same channel broadcast TV program received by the tuner 3a or 3b or show different channel broadcast TV programs.

The remote controller 14 enables the user to change program channels of the TV receiver 12, control the sound volume and give an instruction for recording and/or playback; and such an operation signal from the remote controller 14 is received by the remote control data receiving section 6 and sent to the control section 2; and the control section 2 processes the signal to generate a control signal such as a channel selection control signal, sound volume control signal or recording/playback signal and sends it through the I/O section 7 to the TV receiver 12 and controls the storage 5 to record or play back a received broadcast TV program. In this way, the remote controller 14 is operated to control the TV receiver 12 for various purposes in the same way as in the prior art. The power supply 4 of the controller 1 and the power supply (not shown) of the TV receiver 12 can be turned on or off by the use of the remote controller 14 in the same way as in the prior art.

The remote terminal 10, which enables the user to operate it for various purposes such as channel selection for the broadcast TV program to be shown on its remote display 11 in the same way as the TV receiver 12, provides a remote control mode for operation of the TV receiver 12 in which the TV receiver 12 can be remotely controlled as with the remoter controller 14. In addition, the broadcast TV channel program shown on the remote display 11 can be shown on the TV receiver and the broadcast TV channel program shown on the remote display 11 and that on the TV display 13 can be exchanged.

Furthermore, the communication section 8 enables the user to get a content such as a web page (web content) from an external system such as the Internet through the network 15 so that the content can be supplied to the TV receiver 12 or remote terminal 10 and shown on the display. Such a web mode is selected by operation of the remote controller 14 or remote terminal 10.

Furthermore, the controller 1 may be built in the TV receiver 12 or a separate unit which is independent of the TV receiver 12.

FIG. 2 is an external front view showing a concrete example of the remote terminal 10 shown in FIG. 1, in which 20a denotes a "TV Power" button, 20b a "Remote Control Mode" button, 20c a "Channel Select" button, 20d a "Volume Control" button, 20e a "Mute" button, 21a a "Send Content" button, 21b a "Receive Content" button, 21c a "Related Info" button, 21d a "Record" button, 21e a "Function" button, and 21f a "Home" button and the other components as illustrated in FIG. 1 are designated by the same reference numerals as in FIG. 1.

In FIG. 2, the remote terminal 10 has a display all over its front surface, namely the remote display 11, and the various control buttons which are to be touched by the user are located on both sides of the remote display 11.

Specifically, located on the left of the remote display 11 of the remote terminal 10 are the TV Power button 20a, Remote Control Mode button 20b, Channel Select button 20c, Volume Control button 20d, and Mute button 20e (these control buttons are hereinafter collectively called TV control buttons 20). By operating any of these control buttons, a corresponding operation signal is sent from the remote terminal 10 to the communication section 8 of the controller 1. In the controller 1, the operation signal received by the communication section 8 is sent to the control section 2, which in turn generates a control signal corresponding to the operation signal and sends it through the I/O section 7 to the TV receiver 12. Thus, what is shown on the TV receiver 12 is controlled according to the user's operation of the TV control buttons 20 on the remote terminal 10.

The TV Power button 20a is used to turn on and off the power to the TV receiver 12; the Remote Control Mode button 20b is a button which enables the user to select broadcast programs, recorded programs, web contents and menu screens to be shown on the TV receiver 12 (these are hereinafter collectively called contents and particularly received programs and recorded programs are called received contents and recorded contents respectively) at the remote terminal 10. The Channel Select button 20c is used to change the channel at the TV receiver 12 and the Volume Control button 20d is used to control the sound volume of the TV receiver 12 and the Mute button 20e is used to mute the sound of the TV receiver 12.

Located on the right of the remote display 11 are the Send Content button 21a, Receive Content button 21b, Related Info button 21c, Record button 21d, Function button 21e, and Home button 21f (these control buttons are hereinafter collectively called remote control buttons 21).

The Send Content button 21a is used to let the content shown on the remote display 11 appear on the TV receiver 12. As this Send Content button 21a is touched, content selection information to select the content shown on the remote display 11 is sent together with a corresponding operation signal to the controller 1 and in the controller 1, the communication section 8 receives the operation signal and the control section 2 generates a control instruction signal calling for display of the content, based on the operation signal and content selection information, and sends it through the I/O section 7 to the TV receiver. In this case, the received content supplied so far from the tuner 3a or 3b or the recorded content supplied so far from the storage 5, or the web content supplied so far from the network 15, to the remote terminal 10, is sent to the TV receiver 12 under the control of the control section 2. Consequently, at the TV receiver 12, the display content is switched to the selected content. At the same time, at the remote terminal 10, the display content is switched to another content.

The Receive Content button 21b is used to let the content shown on the TV display 13 appear on the remote display 11. As this Receive Content button 21b is touched, a corresponding operation signal is sent to the controller 1 and in the controller 1, the communication section 8 receives the operation signal and the control section 2 generates an instruction signal calling for display of the content currently shown on the TV receiver 12 in response to the operation signal and sends it through the communication section 8 to the remote terminal 10. As the remote terminal receives the instruction signal, it acquires (or receives) the content as specified by the instruction signal and the remote display 11 shows it. In this case, the received content supplied so far from the tuner 3a or 3b or the recorded content supplied so far from the storage 5, or the web content supplied so far from the network 15, to the TV receiver 12, is sent to the remote terminal 10 under the control of the control section 2. Consequently, at the remote terminal 10, the display content is switched to the specified content. At the same time, at the TV receiver 12 the display content is switched to another content.

The Related Info button 21c is used to show information related to the content shown on the remote display 11 or TV display 13 (for example, information on a scene in a display content). Such related information may be sent from a broadcaster together with a broadcast content or can be acquired from a website through the network 15. When the content is recorded in the storage 5 of the controller 1, related information may be recorded at the same time or acquired from a website upon request.

The Record button 21*d* is used to record the content shown on the remote display 11 or TV display 13 in the storage 5 of the controller 1.

The Function button 21*e* is used to specify the degree of brightness and other display parameters for the remote terminal 10.

The Home button 21*f* is used to call a menu for content selection on the remote display 11 so that the user can select a desired content.

Next, an explanation will be given of an example of flows of screens shown on the remote display 11 and TV display 13 through operation of the remote terminal 10.

FIGS. 3A to 3C illustrate a concrete example of a flow of screens shown on the remote display 11 at the start of the remote terminal 10, in which 30 denotes a mail icon, 31 a HOME screen, 32*a* a HOME option, 32*b* a TV option, 32*c* an EPG (electronic program guide) option, 32*d* a PLAY option, 33 a details display area, 34 content icons and 35 an information window.

While it is not used, the remote terminal 10 should be placed on a terminal rest and turned off. FIG. 3A shows that the TV display 13 and the remote display 11, in which the remote display 11 is off and shows nothing. It is assumed here that the TV receiver 12 is also off and thus nothing is shown on the TV display 13.

In this situation, when the user comes within a given distance from the remote terminal 10 in order to use it, a sensor (not shown) built in the remote terminal 10 detects this and the remote terminal 10 is automatically turned on and started. As it starts up, an initial screen as illustrated in FIG. 3B appears on the remote display 11. On this initial screen, a photo image such as a picture or pattern or an advertisement is shown virtually all over the remote display 11. If there is a received e-mail, the mail icon 30 also appears on the screen.

When the user picks up the remote terminal 10 from the terminal rest with the initial screen shown thereon, a HOME screen 31 appears on the remote display 11 as illustrated in FIG. 3C.

This HOME screen 31 includes an array of option selection touch buttons marked HOME 32*a*, TV 32*b*, EPG 32*c*, and PLAY 32*d*, in which one of these options remains selected (for example, the HOME option 32*a* remains selected by default) and details of the selected option are shown in the details display area 33. If it is assumed that the HOME option 32*a* is selected now, content icons 34, including icons for web page browsing and recorded content icons (record icons) stored in the storage of the controller 1 (FIG. 1) appear in the details display area 33 in a touchable manner and "What's New" information or the like appears in the information window 35.

Though not shown, when the EPG option button 32*c* is touched, a broadcast program guide will appear in the details display area 33. When the PLAY option button 32*d* is touched, a recorded program list appears in the details display area 33 for selection among recorded contents stored in the storage 5.

FIGS. 4A to 4C illustrate a concrete example of flows of screens on the TV display 13 and remote display 11 which are shown by user operation at the remote terminal 10 from the start of the TV receiver 12 until program selection, in which 36 and 36*a* denote received program screens, 37 a program selection screen, 38*a*, 38*b*, and 38*c* thumbnails. In FIGS. 4A to 4C, the same elements as shown in FIG. 1 and FIGS. 3A to 3C are designated by the same reference numerals and their descriptions are omitted and only the elements necessary for an explanation given below are designated by reference numerals in FIGS. 4A to 4C.

In the situation as illustrated in FIG. 3C, when the user touches the TV Power button 20*a* at the remote terminal 10, in response to an instruction signal generated by this user operation the controller 1 (FIG. 1) turns on the TV receiver 12 to start it. This leads to a situation as illustrated in FIG. 4A in which the remote display 11 shows and holds the HOME screen 31 and the TV display 13 shows the received program screen shown just before the TV receiver 12 was turned off last, namely a received program screen 36.

If the TV receiver 12 has previously been started, the TV display 13 already shows a received program screen (e.g. on-air program screen) and the user need not touch the TV Power button 20*a*. Therefore, the situation as illustrated in FIG. 4A is omitted.

A program to be received and shown on the TV display 13 is selected as follows: on the HOME screen 31, first the user touches the TV option button 32*b*, which leads to the situation as illustrated in FIG. 4B. In this situation, while at the TV receiver 12 the TV display 13 shows the received program in the same channel as before, the remote terminal 10 acquires thumbnail information about an on-air program from the EPG or pertinent information stored in the storage 5 of the controller 1 and the remote display 11 shows a Program Selection screen 37 containing a row of such thumbnails 38*a*, 38*b* and 38*c*.

On the Program Selection screen 37, for example, thumbnails 38 (thumbnails 38*a*, 38*b*, 38*c* and so on) representing several on-air programs are horizontally arranged in a row in the channel number order; in this example, three of them are shown on the Program Selection screen 37. By touching the screen with a fingertip lightly and moving the fingertip on it to the right or left, the row of thumbnails 38 is scrolled to the right or left to show thumbnails representing other broadcast programs.

If the user touches a thumbnail 38 for a desired broadcast program, for example, the thumbnail 38*b*, the remote terminal 10 sends an instruction to receive the broadcast program specified by the thumbnail 38*b* to the controller 1 and in the controller 1, one of the tuners 3*a* and 3*b*, which is not engaged in receiving a broadcast program, starts receiving the specified broadcast program and the program thus received is sent to the remote terminal 10. Consequently, at the remote terminal 10, a received program screen 36*a* appears all over the remote display 11 in which the received program as specified above is shown in enlarged form as illustrated in FIG. 4C. Even at this time, the TV receiver 12 still continues to receive and show the program received so far.

By touching the remote display 11 while the received program screen 36*a* is shown on the remote display 11 as illustrated in FIG. 4C, it returns to the Program Selection screen 37 as illustrated in FIG. 4B in which the user can select another channel program. Or by making a scrolling motion in the same manner as on the Program Selection screen 37 as illustrated in FIG. 4B while the received program screen 36*a* is shown at the remote terminal 10 as illustrated in FIG. 4C, the user can change the received program shown on the received program screen 36*a*. In this case, in response to this scrolling motion, a channel change instruction signal is sent to the controller 1 and the controller 1 changes the channel or program to be received by the tuner 3*a* or 3*b* which has been used for the remote terminal 10.

FIGS. 5A to 5C show a concrete example of an operation sequence of letting the screen shown on the remoter display 11 appear on the TV display 13 and flows of screens shown on the TV display 13 and remote display 11, in which 36*a* denotes a received program screen, 40 a program reception remote control screen, 41*a*, 41*b* and 41*c* tabs, 42 pages, 43 program icons, 44 a cursor, 45*a* and 45*b* Close buttons, 46 a related web screen, 47*a* a Related Web tab, 47*b* a Related Program tab, 47*c* a Program Info tab, 48 a web page, 49*a* a Dictionary option, 49*b* a Shop option, 49*c* a Map option, 49*d* a Full Screen option, 50 a cursor, and 51 a web remote control screen. In FIGS. 5A to 5C, the same elements as shown in the foregoing drawings are designated by the same reference numerals and their descriptions are omitted. Again, only the elements necessary for an explanation given below are designated by reference numerals in FIGS. 5A to 5C.

When the Send Content button 21*a* is touched while the TV display 13 and the remote display 11 show different received program screens 36 and 36*a* respectively as illustrated in FIG. 4C, the displays 13 and 11 change to the display situation as illustrated in FIG. 5A.

In this display situation, the received program screen 36*a* shown on the remote display 11 as illustrated in FIG. 4C replaces the received program screen 36 on the TV display 13 by the abovementioned channel change operation under the control by the controller 1 and at the remote terminal 10, the program reception remote control screen 40 appears on the remote display 11 to enable selection of a program to be received and shown on the TV display 12. In this case, on the TV display 13 and remote display 11, the respective current screens scroll up and disappear and new screens scroll up and appear from below. Screen changes in other cases which will be described later are also made similarly unless otherwise specified.

The program reception remote control screen 40 contains tabs for keywords which express broadcasting types such as Terrestrial digital, BS (Broadcasting Satellite) and CS (Communication Satellite), i.e., "TERRESTRIAL" tab 41*a*, "BS" tab 41*b*, and "CS" tab 41*c*. The user selects one of them and a page 42 corresponding to the selected tab 41 (tabs 41*a*, 41*b*, 41*c* and so on) appears. The page 42 contains touchable or selectable program icons 43 for currently available broadcast programs of the broadcasting type corresponding to the keyword represented by the tab 41.

One of the program icons 43 in the page 42 is selected with the cursor 44 as illustrated in FIG. 5A and the TV receiver 12 receives the program corresponding to the program icon 43 selected with the cursor 44 and shows it on the TV display 13. If the user touches another program icon not selected with the cursor 44, the cursor moves to that program icon 43 and the TV receiver 12 receives the program corresponding to the program icon 43 newly selected with the cursor 44 and a corresponding program screen replaces the received program screen 36*a* received so far. Therefore, the cursor 44 represents a program which the TV receiver 12 is currently receiving.

When the user touches the Send Content button so as to let the content (in this case, a received program) thus selected on the remote display 11 appear on the TV display 13, the remote display 11 shows an operation screen suitable for the content being currently shown on the TV display 13 (in this case, the program reception remote control screen 40) so that the user can do operation for that content easily and conveniently.

Like an ordinary web page, the page 42 has a Close button 45*a* in the top right corner; upon touching the Close button 45*a* or the home button 21*f*, the program reception remote control screen 40 disappears and the HOME screen 31 as illustrated in FIG. 4A appears again. On the other hand, at the TV receiver 12, the received program screen 36*a* remains shown.

When the user wants to get information related to the received program shown on the TV display 13 in the display situation as illustrated in FIG. 5A, the user should touch the Related Info button 21*c*. In this case, as illustrated in FIG. 5B, while the received program screen 36*a* remains shown on the TV display 13 of the TV receiver 12, the remote display 11 shows a related web screen 46 which contains tabs for the related options. Here, assuming that the tabs include the Related Web tab 47*a*, Related Program tab 47*b*, and Program Info tab 47*c*, one of these tabs is selected and a corresponding web page 48 appears. In this example, on the assumption that the Related Web tab 47*a* is selected, the web page 48 appears in which information related to the received program screen 36*a* shown on the TV display 13 is shown.

Here, related information means information about facilities such as shops and places of interest such as parks, to which references are made in the content (in this case, the received program screen 36*a*). Such related information is acquired and supplied by the controller 1 as mentioned earlier.

The page 48 (in this case, a web page) contains select buttons for options Dictionary 49*a*, Shop 49*b*, and Map 49*c* so that the user can select one of them by touching it, in order to change what is shown on the page 48, from the related information to information from a dictionary, or information on a shop, or a map including the location of a relevant shop. In addition, the Full Screen button 49*d* is also provided to enlarge and show the page 48 all over the remote display 11. Furthermore, like an ordinary web page, the page 45 has a Close button 45*b* in the top right corner; upon touching the Close button 45*b*, the program reception remote control screen 40 as illustrated in FIG. 5A appears again.

Next, when the user touches the Send Content button 21*a* in the display situation as illustrated in FIG. 5B, the related web screen 46 shown so far on the remote display 11 appears on the TV display 13 as it is and a web remote control screen 51 which functions as a touch pad appears on the remote display 11. The related web screen 46 on the TV display 13 contains a cursor 50 and this cursor 50 can be moved by operating the touch pad on the web remote control screen 51 on the remote display 11. This means that the user can operates the related web screen 46 on the TV display 13 by operation of the touch pad on the web remote control screen 51 on the remote display 11.

Here, when the user touches the Function button 21*e* while the remote display 11 shows the web remote control screen 51, a browser button (not shown) appears, and when the Home button 21*f* is touched, the screen shown on the remote display 11 is changed to the HOME screen 31 as illustrated in FIG. 4A.

Again, when the user touches the Send Content button so as to let the content (in this case, a related web screen) selected on the remote display 11 appear on the TV display 13, the remote display 11 shows an operation screen suitable for the content being currently shown on the TV display 13 (in this case, the web remote control screen 51) so that the user can do operation for that content easily and conveniently.

If the remote display 11 shows a screen other than the program reception remote control screen 40 as illustrated in FIG. 5A, by touching the Remote Control Mode button 20*b* the program reception remote control screen 40 can be shown on the remote display 11 as illustrated in FIG. 5A. Therefore, even in that case, the user can do various operations as illustrated in FIGS. 5A to 5C.

FIGS. 6A to 6C illustrate a concrete example of a flow of screens which are concerned in operation of the Receive Content button 21*b* in FIG. 2 and operation for playback of a content from the storage 5 of the controller 1 in FIG. 1, in which 31a denotes a HOME screen, 34a content icons, and 52 a recorded content screen. In FIGS. 6A to 6C, the same elements as shown in the foregoing drawings are designated by the same reference numerals and their descriptions are omitted. Only the elements necessary for an explanation given below are designated by reference numerals in FIGS. 6A to 6C.

For example, when the user touches the Receive Content button 21b at the remote terminal 10 in the display situation as illustrated in FIG. 5C, the related web screen 46 shown on the TV display 13 is transferred to the remote display 11 and the TV receiver 12 again shows the screen which was shown just before the related web screen 46 (in this case, the received program screen 36a). FIG. 6A illustrates the above-mentioned display situation that the screen shown on the TV display 13 is transferred to the remote display 11 by touching the Receive Content button 21b.

For example, if the user touches the Home button 21f at the remote terminal 10 in the display situation as illustrated in FIG. 6A, the remote display 11 shows a HOME screen 31a similar to the HOME screen 31 as illustrated in FIG. 4A leading to the display situation as illustrated in FIG. 6B, in which the user can do operation in the same way as with the HOME screen 31.

For example, if the user touches a content icon 34a for a desired recorded content on the HOME screen 31a in the display situation as illustrated in FIG. 6B, the screen (recorded content screen) 52 for the recorded content played back from the storage 5 of the controller 1 (FIG. 1) (such a content as a recorded program or recorded web page) is shown all over the remote display 11, as illustrated in FIG. 6C. Again, the screen shown on the TV display 13 remains unchanged, namely the received program screen 36a remains shown.

Thus, by touching the Home button 21f, the desired recorded content can be shown on the remote display 11.

FIGS. 7A to 7C illustrate a concrete example of a flow of screens which are concerned in operation for playback of a recorded content, in which 31b denotes a HOME screen, 45c and 45d Close buttons, 52a a recorded content playback screen, 53 a playback remote control screen, 54 playback operation buttons, 54a a Stop button, and 55 playback related images. In FIGS. 7A to 7C, the same elements as shown in the foregoing drawings are designated by the same reference numerals and their descriptions are omitted. Only the elements necessary for an explanation given below are designated by reference numerals in FIGS. 7A to 7C.

When the user touches the Send Content button 21a at the remote terminal 10 in the display situation as illustrated in FIG. 6C, the recorded content playback screen 52 shown on the remote display 11 is transferred to the TV receiver 12 and the TV display 13 shows the recorded content playback screen 52a as illustrated in FIG. 7A. At the same time, the remote display 11 shows the playback remote control screen 53 which contains playback operation buttons 54 for Playback, Stop, Pause, Fast-forward, and Rewind, a playback progress bar and playback-related images 55 showing playback scenes at different times, so that by touching any of these operation buttons 54, a corresponding operation signal is sent from the remote terminal 10 to the controller 1 (FIG. 1) in which the control section 2 controls operation of the storage 5 to enable various playback operations on the remote display 11. The remote terminal 10 thus functions as a remote controller for playback of a recorded content.

Again, when the user touches the Send Content button so as to let the content (in this case, a recorded content playback screen) selected on the remote display 11 appear on the TV display 13, the remote display 11 shows an operation screen suitable for the content being currently shown on the TV display 13 (in this case, the playback remote control screen 53) so that the user can do operation for that content easily and conveniently.

The playback remote control screen 53 contains a Close button 45c; upon touching the Close button 45c, at the remote terminal 10 the HOME screen (the HOME screen 31 in FIG. 4A or the HOME screen 31a in FIG. 6B) appears on the remote display 11. On the other hand, the TV receiver 12 continues playback, or continues showing the recorded content playback screen 52.

When the user touches the Stop button 54a among the playback operation buttons 54 on the playback remote control screen 53 shown on the remote display 11 in the display situation as illustrated in FIG. 7A, the TV receiver 12 returns to the program receiving state in which it was just before the appearance of the recorded content playback screen 52a, or a received program screen 36a is shown on the TV display 13 as illustrated in FIG. 7B.

Also, the remote terminal 10 shows a program reception remote control screen 40a similar to the program reception remote control screen 40 in FIG. 5A so that the user can select a program or change the program at the TV receiver 12 as explained earlier in reference to FIG. 5A.

When the recorded content playback screen is replaced by the received program screen on the TV display 13 as illustrated in FIGS. 7A and 7B, in response to this replacement the playback remote control screen 53 is also replaced by the program reception remote control screen 40 on the remote display 11, so the user can do operation for the content shown on the TV display 13 easily and smoothly.

Thus, like the remote controller, the remote terminal 10 has a function to enable the user to play back recorded contents and select channels for programs to be received.

When the user touches the Close button 45d on the program reception remote control screen 40a shown on the remote display 11 in the display situation as illustrated in FIG. 7B, the remote display 11 shows the Home screen 31b as illustrated in FIG. 7C as when the user touches the Close button 45a on the program reception remote control screen 40 at the remote terminal 10. In this case as well, at the TV receiver 12, the received program screen 36a which has been shown so far on the TV display 13 remains there as it is.

As discussed above, in this embodiment, by operating the control buttons of the remote terminal 10 and touching screens shown there, the user can select broadcast programs, web pages and recorded contents and get related information and transfer contents (screens) between the remote terminal 10 and the TV receiver 12.

The flows of screens concerned in various operation sequences have been explained so far. Also, various screens can be shown similarly by using the control buttons of the remote terminal 10 as illustrated in FIG. 2. The operation sequences involved with these control buttons are explained below.

FIG. 8 is a flowchart showing screen changes which occur upon touching the Send Content button 21a in FIG. 2.

Referring to FIG. 8, when the user touches the Send Content button 21a at the remote terminal 10 (Step S100), if the remote display 11 shows the received program screen 36a as illustrated in FIG. 4C (Yes at Step S101), as illustrated in FIG. 5A the received program screen 36a is transferred to the TV receiver 12 in which the TV display 13 shows the same received program screen 36a (Step S102) and the remote display 11 shows the program reception remote control screen 40 to enable remote control to select a program to be received at the TV receiver 12 (Step S103).

When the user touches the Send Content button 21a at the remote terminal 10 (Step S100), if the remote display 11 shows the recorded content playback screen 52 as illustrated in FIG. 6C (Yes at Step S104), as illustrated in FIG. 7A the recorded content playback screen 52 is transferred to the TV receiver 12 in which the TV display 13 shows the same recorded content playback screen 52a (Step S105) and the remote display 11 shows the playback remote control screen 53 to enable remote control of the recorded content at the TV receiver 12 (Step S106).

Furthermore, when the user touches the Send Content button 21a at the remote terminal 10 (Step S100), if the remote display 11 shows a web screen such as the related web screen 46 as illustrated in FIG. 5B (Yes at Step S107), as illustrated in FIG. 5C the web screen is transferred to the TV receiver 12 in which the TV display 13 shows it (Step S108) and the remote display 11 shows a web remote control screen to enable the user to select a web page (Step S109).

When the remote display 11 shows one of the screens other than the abovementioned ones, such as the HOME screens 31 to 31b in FIG. 3C, FIG. 4A, FIG. 6B, and FIG. 7C and the remote control screens in FIG. 5A, FIG. 5C, and FIG. 7B, even if the user touches the Send Content button 21a at the remote terminal 10 (No at Steps S101, S104, and S107), the respective displays 11 and 13 of the remote terminal 10 and TV receiver 12 remain unchanged (Step S110).

FIG. 9 is a flowchart showing screen changes which occur upon touching the Remote Control Mode button 20b in FIG. 2.

Referring to FIG. 9, when the user touches the Remote Control Mode button 20b at the remote terminal 10 (Step S200), if the TV display 13 of the TV receiver 12 shows the received program screen 36a as illustrated in FIG. 5A (Yes at Step S201), the remote display 11 of the remote terminal 10 shows the program reception remote control screen 40 or 40a as illustrated in FIG. 5A or FIG. 7B to enable the user to select a program to be received (Step S202).

When the user touches the Remote Control Mode button 20b at the remote terminal 10 (Step S200), if the TV display 13 of the TV receiver 12 shows the recorded content playback screen 52a as illustrated in FIG. 7A (Yes at Step S203), the remote display 11 of the remote terminal 10 shows the playback remote control screen 53 as illustrated in FIG. 7A to enable control of playback of the recorded content (Step S204). Consequently the user can stop playback of the content or fast forward or rewind it.

Furthermore, when the user touches the Remote Control Mode button 20b at the remote terminal 10 (Step S200), if the TV display 13 of the TV receiver 12 shows the related web screen 46 as illustrated in FIG. 5C (Yes at Step S205), the remote display 11 of the remote terminal 10 shows the web remote control screen 51 as illustrated in FIG. 5C to enable the use of the cursor with the related web screen 46 (Step S206).

When the TV display 13 shows a screen other than the abovementioned screens (No at Step S201, S203, and S205), even if the user touches the Remote Control Mode button 20b at the remote terminal 10, the displays remain unchanged (Step S207).

Figure 10:
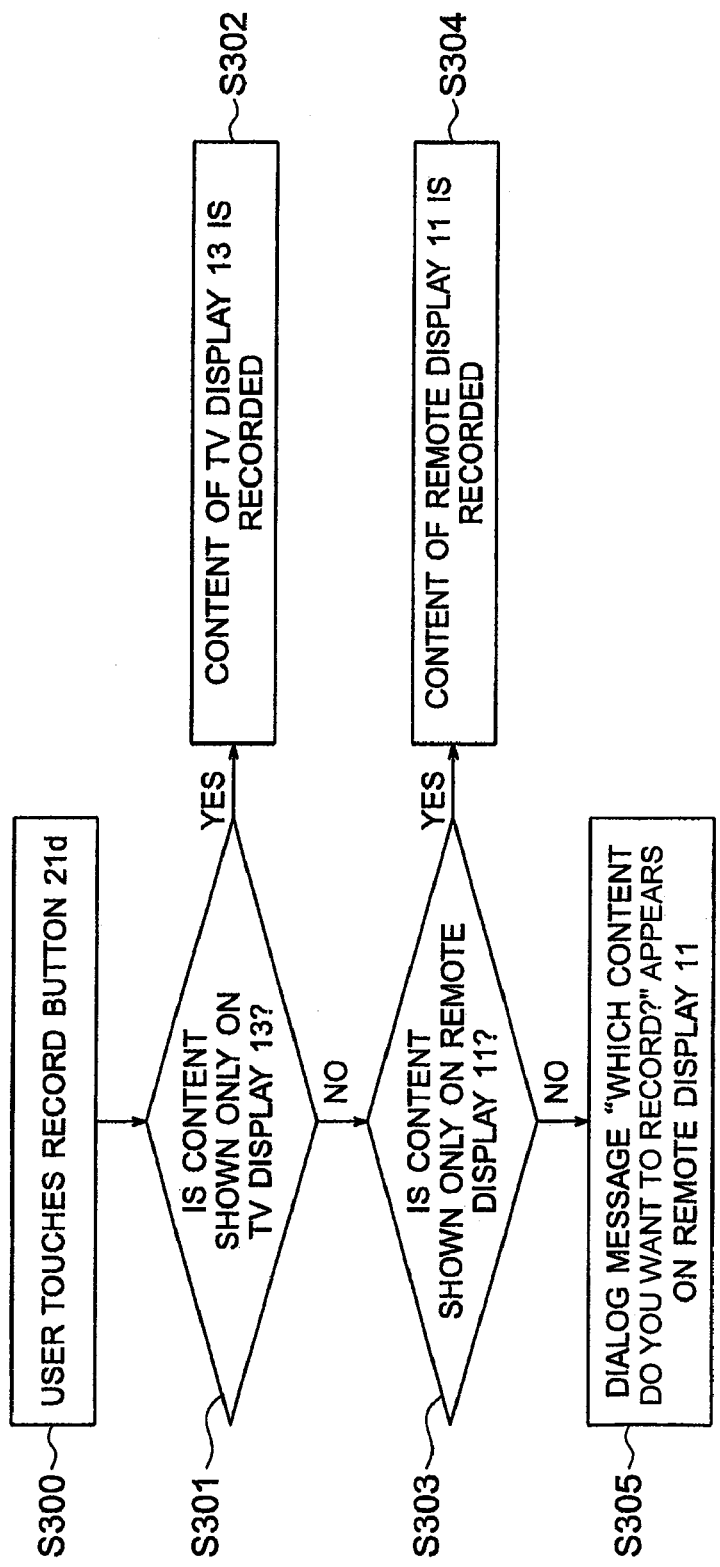
FIG. 10 is a flowchart showing screen changes upon touching the Record button in FIG. 2.

FIG. 10 is a flowchart showing screen changes which occur upon touching the Record button 21d in FIG. 2.

Referring to FIG. 10, when the user touches the Record button 21d at the remote terminal 10 (Step S300), if only the TV display 13 of the TV receiver 12 shows a content (the received program screen 36a as illustrated in FIG. 5A or the web page screen as illustrated in FIG. 5C) (Yes at Step S301), the content is stored in the storage 5 of the controller 1 (Step S302).

Also, when the user touches the Record button 21d at the remote terminal 10 (Step S300), if only the remote display 11 of the remote terminal 10 shows such a content (Yes at Step S303), the content is stored in the storage 5 of the controller 1 (Step S304).

Furthermore, when the user touches the Record button 21d at the remote terminal 10 (Step S300), if both the TV display 13 of the TV receiver 12 and the remote display 11 of the remote terminal 10 show such contents (No at Step S301 and No at Step S303), a dialog screen showing a message like "Which content do you want to record?" (not shown) appears on the remote display 11 of the remote terminal 10 to prompt the user to select one of the contents (Step S305) and once a selection is made here, it is decided that the answer is Yes either at Step S301 or at Step S303 and recording is performed at Step S302 or Step S304.

FIG. 11 is a flowchart showing screen changes which occur upon touching the Related Info button 21c in FIG. 2.

Referring to FIG. 11, when the user touches the Related Info button 21c at the remote terminal 10 (Step S400), if only the TV display 13 of the TV receiver 12 shows a content (the received program screen 36a as illustrated in FIG. 5A or the web page screen as illustrated in FIG. 5C) (Yes at Step S401), a screen showing information related to the content shown on the TV display 13, for example, the related web screen 46 as illustrated in FIG. 5B, appears on the remote display 11 of the remote terminal 10 (Step S402).

Also, when the user touches the Related Info button 21c at the remote terminal 10 (Step S400), if only the remote display 11 of the remote terminal 10 shows such a content (Yes at Step S403), a screen showing information related to the content shown on the remote display 11, for example, the related web screen 46 as illustrated in FIG. 5B, appears on the remote display 11 of the remote terminal 10 (Step S404).

Furthermore, when the user touches the Related Info button 21c at the remote terminal 10 (Step S400), if both the TV display 13 of the TV receiver 12 and the remote display 11 of the remote terminal 10 show such contents (No at Step S401 and No at Step S403), a dialog screen showing a message like "Which content do you want information for?" (not shown) appears on the remote display 11 of the remote terminal 10 to prompt the user to select one of the contents for which related information is to be shown (Step S405) and once a selection is made here, it is decided that the answer is Yes either at Step S401 or at Step S403 and related information is shown at Step S402 or Step S404.

Thus, by touching the Related Info button 21c while the TV display 13 or remote display 11 shows a content, the user can see information related to the content on the remote display 11.

It has been explained earlier that when the user touches an icon 34a for a desired content on the HOME screen 31a shown on the remote display 11 as illustrated in FIG. 6B, as illustrated in FIG. 6C the remote display 11 shows a screen representing the content, then when the user touches the Send Content button 21a at the remote terminal 10, the content screen shown on the remote display 11 is transferred to the TV receiver 12 and the TV display 13 shows it as illustrated in FIG. 7A.

It has also been explained earlier that when the user touches a thumbnail 38b for a desired program on the program selection screen 37 shown on the remote display 11 as illustrated in FIG. 4B, as illustrated in FIG. 4C the remote display 11 shows a screen representing the received program, then when the user touches the Send Content button 21a at the remote terminal 10, the received program screen shown on the remote display 11 is transferred to the TV receiver 12 and the TV display 13 shows it as illustrated in FIG. 5A.

On the other hand, in this embodiment the following alternative display operation method is also possible: by touching an icon on the HOME screen 31a as illustrated in FIG. 6B or touching a thumbnail on the program selection screen 37 as illustrated in FIG. 4B, a content corresponding to the selected icon or thumbnail is directly shown on the TV display 13.

FIG. 12 is a flowchart showing a processing sequence concerned in the above alternative display operation method, in which the icons and thumbnails are collectively called content buttons.

Referring to FIG. 12, when the user touches a content button with his/her fingertip while the remote display 11 shows an operation screen with content buttons such as the HOME screen 31a or the program selection screen 37 (Step S500) and then as the fingertip leaves the remote display 11, it leaves the content button (Step S501), if the fingertip leaves the content button while moving upward on the remote display 11 at a given speed or more (Yes at Step S502), the content screen corresponding to the content button is directly shown on the TV display 13 (Step S503); on the other hand, if the fingertip leaves the content button without such a movement (No at Step S502), the content screen corresponding to the content button is directly shown on the remote display 11 as illustrated in FIG. 6C and FIG. 4C (Step S504). In the latter case, by touching the Send Content button 21a, the content screen is transferred to the TV display 13 and shown there as mentioned above. Therefore, by touching a content button in a manner indicated in FIG. 12, a content screen can be shown on the TV display 13 directly without touching the Send Content button 21a.

As described above, in this embodiment, by using the remote terminal 10, the user can do operation for various contents such as received programs, web pages, and recorded contents to be shown on the display of the TV receiver 12, or the TV display 13 and transfer various screens between the remote display 11 and TV display 13.

FIGS. 13A and 13B and FIGS. 14A and 14B illustrate a substantial part of a television operation method according to a second embodiment of the present invention, in which 50 denotes a camera, 61 a user, and 62 the user's line of sight. In FIGS. 13A and 13B and FIGS. 14A and 14B, the same elements as shown in the foregoing drawings are designated by the same reference numerals and their descriptions are omitted here.

The second embodiment is different from the first embodiment in that the user's line of sight can be used in operation for transferring various screens between the remote display 11 and TV display 13. The rest is the same as in the first embodiment.

Referring to FIGS. 13A and 13B, the camera 60 is located on the top of the remote display 11 of the remote terminal 10 in a way that the camera takes an image of an area ahead of the remote display 11. The image thus taken is transmitted to the controller 1 (FIG. 1) and sent to its control section 2 where it is processed.

As illustrated in FIG. 13A, when the user 61 holds the remote terminal 10 in his/her hand, the camera 60 takes an image of an area including the face of the user 61 and if both the eyes of the user 61 are within a prescribed area in the imaging range of the camera 60, the control section 2 of the controller 1 detects the image of the eyes and detects the movement of the line of sight from the movement of the eyes. The area in which the eyes can be detected is an area which includes the image of the eyes in the imaging range of the camera 60 when the user 61 looks at the remote display 11 with his/her face right in front of it. Here, assuming that a content, for example, the received program screen 36a, is shown on the remote display 11, if the control section 2 of the controller 1 detects that the line of sight 62 is directed straight toward the front of the remote display 11, the displays remain unchanged, or the received program screen 36a remains shown on the remote display 11 and the current screen (not shown) remains shown on the TV display 13 of the TV receiver 12.

On the other hand, if, in order to let the received program screen 36a currently shown on the remote display 11 appear on the TV display 13, as illustrated in FIG. 13B, the user 61 directs his/her line of sight 62 toward the remote display 11 for a given time duration and then moves and holds the line of sight 62 toward a specific direction with respect to the remote display 11, for example, upward for a given time duration, the control section 2 of the controller 1 detects this and determines that it receives an instruction from the remote terminal 10 to transfer the received program screen 36a to the TV display 13 and lets the TV display 13 show the received program screen 36a.

In order to transfer the received program screen 36a from the remote display 11 to the TV display 13 in this way, the user 61 must hold the remote display 11 in a way to make it parallel to the TV display 13, and if the user 61 directs his/her line of sight 62 toward an upward direction with respect to the remote display 13, it means that the line of sight 62 is directed toward the TV display 13. In other words, if, after the line of sight 62 is directed toward the remote display 11 for a given time duration, it is moved and directed toward the TV display 13 for a given time duration as mentioned above, this movement of the line of sight 62 is interpreted to express an intention to transfer the received program screen 36a from the remote display 11 to the TV display 13. This will give the user 61a feeling as if he/she transferred it through his/her line of sight 62. Also, if the line of sight 62 is held directed toward the TV display 13 for a given time duration, it indicates that the user 61 intends that the received program screen 36a thus transferred be shown on the TV display 13. This will give the user 61a feeling as if he/she placed the received program screen 36a transferred by his/her line of sight 62 on the TV display 13.

After the received program screen 36a is transferred from the remote display 11 to the TV display 13 in this way, the remote display 11 shows another screen, for example, the program reception remote control screen 40 as illustrated in FIG. 5A.

In addition, in the display situation as illustrated in FIG. 13B, if the user 61's line of sight 62 is directed toward the TV display 13, or an upward direction with respect to the remote display 11, for a given time duration or more and then directed toward the remote display 11, a given time after that, the received program screen 36a shown on the TV display 13 is transferred to the remote display 11. In this case, the TV display 13 returns to the screen which was shown just before the received program screen 36a.

Another concrete example may be as follows: even if the line of sight 62 is directed toward the TV display 13 for a given time duration and then directed towards the remote display 11, the received program screen 36a shown on the TV display 13 is not transferred to the remote display 11 and the program reception remote control screen 40 as illustrated in FIG. 5A is shown instead. This means that the program reception remote control screen 40 can be shown without manual operation.

FIGS. 14A and 14B show a case that the related web screen 46 is shown on the remote display 11; like the case of FIGS. 13A and 13B, the line of sight 62 is directed toward the remote display 11 showing the related web screen 46, for a given time duration as illustrated in FIG. 14A and then it is directed toward the TV display 13 as illustrated in FIG. 14B and after this situation is held for a given time duration, the related web screen 46 appears on the TV display 13 and the remote display 11 shows the web remote control screen 51 as illustrated in FIG. 5C.

In this case as well, if the user 61's line of sight 62 is directed toward the TV display 13, or an upward direction with respect to the remote display 11, for a given time duration or more and then directed toward the remote display 11, after this situation is held for a given time duration, the remote display 11 returns to the related web screen 46.

It should be understood by those skilled in the art that various modifications, combinations, sub-combinations and alterations may occur depending on design requirements and other factors insofar as they are within the scope of the appended claims or the equivalents thereof.

What is claimed is:

1. A television (TV) operation method as a display method for a TV receiver equipped with a remote terminal having a display, comprising the steps of:
    using control buttons provided adjacent to the display of the remote terminal for operation of the TV receiver; and
    showing, on the display of the remote terminal, a remote control screen to control a content screen shown on a display of the TV receiver,
    wherein one of the control buttons provided adjacent to the display of the remote terminal is a "Send Content" button which is used to transfer a content screen shown on the display of the remote terminal to the display of the TV receiver and show the content screen on the display of the TV receiver;
    wherein another one of the control buttons provided adjacent to the display of the remote terminal is a "Receive Content" button which is used to transfer a content screen shown on the display of the TV receiver to the display of the remote terminal and show the content screen on the display of the remote terminal; and
    wherein when the "Send Content" button is operated while the display of the TV receiver shows a received program screen, the display of the remote terminal shows a reception remote control screen which enables selection of a program to be received and shown on the display of the TV receiver.

2. The television operation method according to claim 1, wherein one of a plurality of select buttons shown on the reception remote control screen shown on the display of the remote terminal controls the display of the TV receiver show a program selection screen for selecting a program to be received and shown on the display of the TV receiver.

3. The television operation method according to claim 1, wherein one of the control buttons provided adjacent to the display of the remote terminal is a "Related Info" button which is used, when the display of the TV receiver shows a content screen, to show a related web screen for selection of information related to the content screen.

4. The television operation method according to claim 3, wherein as the "Send Content" button is operated while the display of the remote terminal shows the related web screen, the related web screen appears on the display of the TV receiver and a web remote control screen for control of the related web screen with a cursor appears on the display of the remote terminal.

5. The television operation method according to claim 1, wherein one of the control buttons provided adjacent to the display of the remote terminal is a "Home" button which is used to control the remote terminal show a "HOME" screen which enables selection of a recorded content for playback.

6. The television operation method according to claim 5, wherein as a recorded content is selected on the "HOME" screen shown on the display of the remote terminal, the selected recorded content appears on the display of the remote terminal, and
    when the "Send Content" button is operated, a playback screen for the selected recorded content appears on the display of the TV receiver and a playback remote control screen for control of playback of the recorded content shown on the display of the TV receiver appears on the display of the remote terminal.

7. The television operation method according to claim 6, wherein as an operation to stop playback is input on a playback remote control screen, a received program screen appears on the display of the TV receiver and a reception remote control screen for selection of a program to be received and shown on the display of the TV receiver appears on the display of the remote terminal.

8. The television operation method according to claim 1, further comprising:
    detecting with a detector a direction of a line of sight of a user using the remote terminal; and
    wherein according to a change in the direction of the line of sight is detected by the detector, a first content screen shown on the display of the remote terminal is transferred to the display of the TV receiver and shown there, and a second content screen shown on the display of the TV receiver is transferred to the display of the remote terminal and shown there.

* * * * *